US010693945B2

(12) United States Patent
Wang et al.

(10) Patent No.: US 10,693,945 B2
(45) Date of Patent: *Jun. 23, 2020

(54) FILE AND FOLDER REDIRECTION FOR VIRTUAL DESKTOPS VIA IMAGE SCANNING

(71) Applicant: VMware, Inc., Palo Alto, CA (US)

(72) Inventors: Dong Wang, Beijing (CN); Haiou Jiang, Palo Alto, CA (US); Yunfei San, Beijing (CN); Peng Guo, Beijing (CN); Kun Shi, Beijing (CN)

(73) Assignee: VMware, Inc., Palo Alto, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/879,410

(22) Filed: Jan. 24, 2018

(65) Prior Publication Data

US 2019/0230152 A1  Jul. 25, 2019

(51) Int. Cl.
*G06F 9/451* (2018.01)
*H04L 29/08* (2006.01)
(Continued)

(52) U.S. Cl.
CPC .............. *H04L 67/06* (2013.01); *G06F 9/452* (2018.02); *G06F 16/13* (2019.01); *G06F 16/16* (2019.01); *G06K 7/10722* (2013.01); *G06K 7/1417* (2013.01); *H04L 67/02* (2013.01); *H04L 67/141* (2013.01)

(58) Field of Classification Search
CPC ....... H04L 29/08; H04L 67/025; G06F 17/00; G06F 17/30; G06F 9/4445; G06F 9/45558; G06F 9/452; H04W 88/02; G06Q 20/3274
See application file for complete search history.

(56) References Cited

U.S. PATENT DOCUMENTS 6,801,576 B1   10/2004  Haldeman
10,146,566 B2 * 12/2018  Malakapalli ........ G06F 9/45533
(Continued)

OTHER PUBLICATIONS

Jong Wang, et al. "Redirecting Multimedia Captured on a Mobile Device to a Virtual Desktop Using Image Scanning", U.S. Appl. No. 15/653,692, filed Jul. 19, 2017.
(Continued)

*Primary Examiner* — Aftab N. Khan (57) ABSTRACT

Techniques are described for file/folder redirection for virtual desktops using image scanning. A virtual desktop client establishes a web server on the client computing device. The virtual desktop client detects input requesting file/folder redirection and displays a QR code encoded with the IP address of the web server. A mobile device scans the QR code using a digital camera and launches a web browser to establish a connection with the web server. User input is entered on the mobile device, indicating one or more files/folders to be shared with the virtual desktop. The information identifying the selected files/folders is sent to the client computing device. The selected files/folders are registered with the virtual desktop and the virtual desktop locally mounts a corresponding folder. The client computing device receives file I/O operations from the virtual desktop and redirects the file I/O operations to the mobile device over a secured HTTP connection.

20 Claims, 6 Drawing Sheets

(51) Int. Cl.
*G06K 7/14* (2006.01)
*G06K 7/10* (2006.01)
*G06F 16/13* (2019.01)
*G06F 16/16* (2019.01)

(56) References Cited

U.S. PATENT DOCUMENTS

| | | | |
|---|---|---|---|
| 2009/0216975 A1* | 8/2009 | Halperin | G06F 9/45537 711/162 |
| 2010/0313199 A1 | 12/2010 | Chen | |
| 2011/0018963 A1 | 1/2011 | Robinson | |
| 2012/0326851 A1 | 12/2012 | Xu | |
| 2013/0221083 A1* | 8/2013 | Doss | H04W 12/04 235/375 |
| 2013/0225080 A1* | 8/2013 | Doss | H04L 63/10 455/41.2 |
| 2013/0225081 A1* | 8/2013 | Doss | H04W 4/21 455/41.2 |
| 2013/0262687 A1 | 10/2013 | Avery | |
| 2014/0181256 A1 | 6/2014 | Trifa | |
| 2014/0304322 A1 | 10/2014 | Dey | |
| 2015/0244812 A1* | 8/2015 | Brunson | H04L 67/141 709/203 |
| 2016/0057135 A1 | 2/2016 | Jiang | |
| 2016/0378782 A1* | 12/2016 | Jiang | G06F 16/176 726/7 |
| 2017/0300189 A1 | 10/2017 | Pendergast | |
| 2017/0351537 A1 | 12/2017 | AbiEzzi | |
| 2018/0220189 A1 | 8/2018 | Hodge | |
| 2019/0026121 A1* | 1/2019 | Wang | G06Q 20/3274 |
| 2019/0026122 A1* | 1/2019 | Wang | G06Q 20/3274 |
| 2019/0164165 A1 | 5/2019 | Ithabathula | |

OTHER PUBLICATIONS

Jong Wang, et al. "Redirecting Multimedia Output of a Virtual Desktop to a Mobile Device Using Image Scanning", U.S. Appl. No. 15/653,705, filed Jul. 19, 2017.

* cited by examiner

FILE AND FOLDER REDIRECTION FOR VIRTUAL DESKTOPS VIA IMAGE SCANNING

TECHNICAL FIELD

The present disclosure generally relates to virtual desktop infrastructure and more specifically to techniques for using a web server to enable file and folder redirection on a virtual desktop via image scanning.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise (or a third-party service provider), and each host server may execute multiple virtual desktops. Users can utilize a client device to remotely log into their individual virtual desktop and all of the application execution takes place on the remote host server that is linked to the local client device over a network using a remote display protocol, such as remote desktop protocol (RDP), PC-over-IP protocol (PCoIP), VMware Blast, virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

In some cases, when working on a remote virtual desktop, a user may wish to make some of the files and folders that reside on their client device accessible on the virtual desktop. For example, the user may wish to use the photo editing software application available on their virtual desktop to edit a photograph that is stored on their client device. In order to enable the photo editing application to access the photograph, the photo must first be made accessible to the virtual desktop. One way to do this could be for the user to upload the file to the remote desktop in some way, such as by emailing the file as an attachment and then saving the attachment from a mail client opened on the virtual desktop. This is of course time consuming and inconvenient to most users. There are numerous other methods of uploading the file, however most of these ways require some external software or tools to be utilized and typically involve inconvenient manual transferring of files back and forth between the desktop and the client device.

To address these inconveniences, some virtual desktop technologies offer a file and folder redirection feature which allows users to redirect local files and folders residing on their client device to the virtual desktop. Using this feature, a user may select a local folder (e.g. "C:/Documents") on their client device, such as a laptop, and redirect it to the virtual desktop. The folder will be mounted to the virtual desktop and the user will be able to edit the files inside the folder using applications installed on the virtual desktop.

The redirection feature is useful to many users, however conventionally it only supports redirecting files and folders from local storage. Therefore, if a user is accessing their virtual desktop using a laptop client and wishes to share some files stored on a different device, such as their smartphone or tablet, the user would need to download and install the virtual desktop client application on each of those devices before the file could be redirected to the virtual desktop. This is usually too time consuming and inconvenient for most users and the difficulties are further compounded by the fact that most companies who provide virtual desktops also implement access control policies that prevent unregistered devices from accessing the virtual desktop infrastructure. As such, if the user has not registered their device, the user would not be able to take advantage of the file redirection feature. A more efficient way to share and access files on the virtual desktop is needed.

DETAILED DESCRIPTION

Systems and methods in accordance with various embodiments of the present disclosure overcome at least some of the above-mentioned shortcomings by providing an improved file and folder redirection for virtual desktops. The redirection is implemented using image scanning in combination with a web server such that the files and folders located on various devices (e.g., smartphones, tablet computers, etc.) can be shared with the virtual desktop without the need to install a virtual desktop client application on those devices.

In various embodiments, when a virtual desktop client application is first launched on a client computing device, it sets up a web server on the computing device. The web server is configured to host a web application for enabling file and folder redirection between the virtual desktop and other devices capable of establishing a network connection with the client computing device.

Once the web server has been set up, a user of the client computing device may provide input requesting file and folder redirection with another device, such as a nearby smartphone, laptop or tablet computer. For example, the user may click on a "Share files/folders with nearby device" button or menu item displayed on a GUI of the virtual desktop client. In response to detecting such input, the virtual desktop client application displays an image, such as a Quick Response (QR) code on the graphical user interface (GUI) of the client computing device. In one embodiment, the QR code is encoded with information (e.g., IP address) identifying the web server that has been established on the client computing device by the virtual desktop client application. Once the QR code (or similar encoded image) is displayed on the virtual desktop client, a mobile device located in physical proximity can be used to scan the QR code, for example by utilizing QR scanning software and a digital camera of the mobile device. When the QR code is scanned, a web browser is automatically launched on the mobile device and establishes a secured HTTP connection with the web server operating on the client computing device. The web browser on the mobile device downloads and executes the web application hosted by the web server operating on the client computing device for enabling file/folder redirection.

Once the connection has been established, a popup dialog box can be displayed on the mobile device, enabling the user to select folders and/or files to be shared with the virtual desktop. In one embodiment, the user selects a folder residing on the mobile device to be made accessible on the virtual desktop. The information identifying the folder (e.g. file/directory path in the file system) is sent from the web browser of the mobile device to the web server operating on the client computing device.

The virtual desktop client application on the client computing device then registers the folder with the virtual desktop and sends an instruction to the virtual desktop to mount a corresponding folder locally on the virtual desktop. A corresponding folder is mounted on the virtual desktop, appearing as local storage, such as a new drive on the virtual desktop. The file input/output (I/O) operations on any files in this folder which are invoked by applications of the virtual desktop are first transmitted from the virtual desktop to the client computing device over a virtual channel of a remoting protocol (e.g. PCOIP, Blast, RDP, VNC, etc.). The virtual desktop client application on the computing device then redirects those file I/O operations to the mobile device over the secured HTTP connection established with the web application operating on the mobile device. In this manner, the files and content in the redirected folder appear to the applications operating on the virtual desktop as though the files were locally stored on the virtual desktop, however the actual content resides on the mobile device, with any read and write requests being redirected to the mobile device. As such, the user may, for example, open a file such as a digital photograph stored on the mobile device and edit it by using photo editing software (e.g. Photoshop) installed on the virtual desktop. The user is then able to save any edits to the file by using the file I/O redirection to the mobile device.

Figure 1:
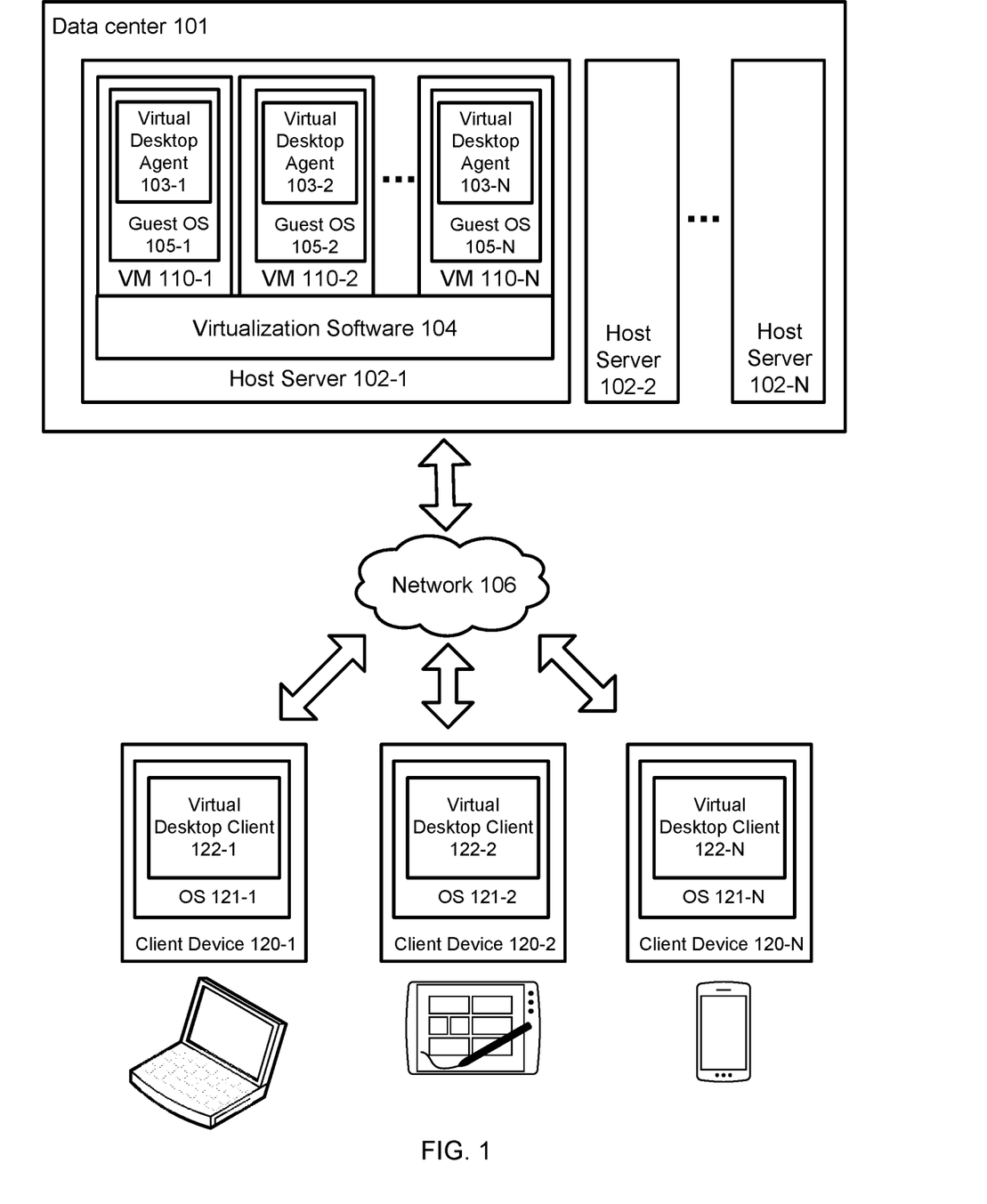
FIG. 1 illustrates an example of a virtual desktop environment, in accordance with various embodiments.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the virtual desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local client device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each VM hosting a desktop for each individual user. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In one embodiment, the interaction is performed by the virtual desktop agent transmitting encoded visual display information (e.g., framebuffer pixel data) over the network to the virtual desktop client and the virtual desktop client in turn transmitting user input events (e.g. keyboard, mouse, touch input events) to the remote desktop agent. Interactions between the virtual desktop client (e.g., 122-1, 122-2, 122-N) and the virtual desktop agent (e.g. 103-1, 103-2, 103-N), including transmission of encoded visual display information from the agent to the client and user input events from the client to the agent can be performed using a remote desktop protocol, such as Remote Desktop Protocol (RDP), PC-over-IP protocol (PCoIP), VMware Blast protocol, virtual network computing (VNC) protocol, or the like.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment might include many more host servers, which may be distributed over multiple data centers, which can include many other types of devices, such as switches, power supplies, cooling systems, environmental controls, and the like, which are not illustrated herein. Similarly, a single host server would typically host many more virtual machines than the number shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
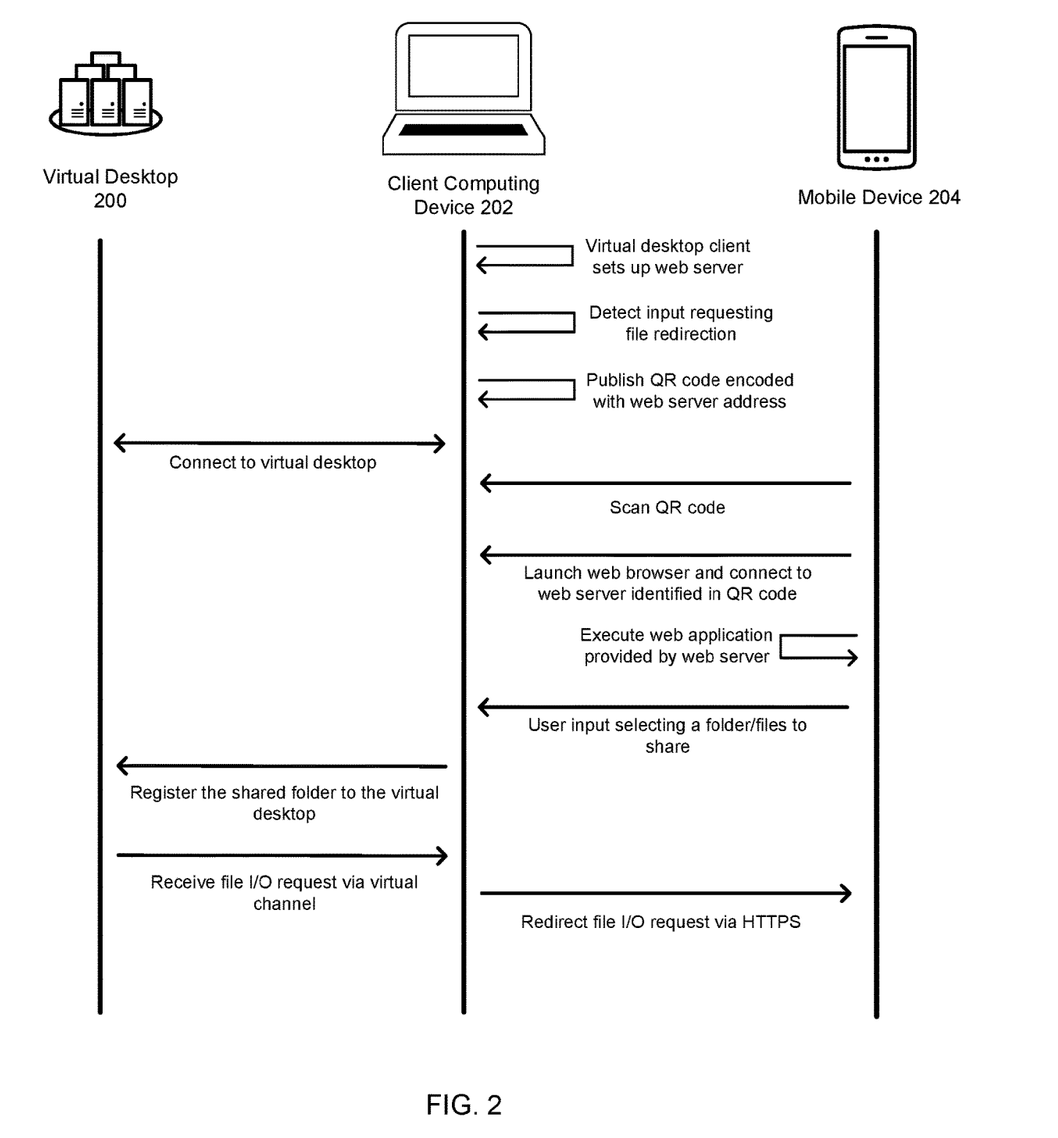
FIG. 2 illustrates an example of communications flow between the virtual desktop, the client computing device and a mobile device for enabling file and folder redirection, in accordance with various embodiments.

FIG. 2 illustrates an example of communications flow between the virtual desktop, the client computing device and a mobile device for enabling file and folder redirection, in accordance with various embodiments. The client computing device 202 can be any computing device having a virtual desktop client application installed thereon. In one embodiment, the client computing device 202 is the user's personal computer (PC) or laptop, however in alternative embodiments, the client computing device may be a smartphone or tablet computer or any other device capable of having a virtual desktop client application installed thereon.

In various embodiments, the virtual desktop client application is downloaded and installed on client computing device 202. As shown in the figure, when the virtual desktop client application is launched, the virtual desktop client application sets up a web server on the computing device 202 that will be used for enabling file and folder redirection. The web server is configured to host a web application that can be executed on a web browser of any mobile device that wishes to share files and folders with the virtual desktop.

In various embodiments, the redirection can be started by detecting user input requesting file and folder redirection. The virtual desktop client application on the client computing device 202 can accept input by displaying a user interface (UI) widget, such as a button or menu item, in the GUI of the virtual desktop. When the owner clicks on the UI widget indicating that file redirection should be started, a QR code (or other encoded image) is displayed on the display screen of the computing device 202 (e.g. shown in a popup dialog box). The QR code is encoded with information identifying the web server (e.g. IP address of the web server) established by the virtual desktop client on the computing device 202.

Once the QR code is displayed, any mobile device in proximity of the client computing device 202 may be used to scan the QR code to start the file and folder redirection. As shown in the illustration, the mobile device 204 is used to scan the QR code. The mobile device 204 may be any computing device that is equipped with a digital camera and QR scanning software, as well as capable of accessing the Internet. QR codes will be described in further detail with reference to FIG. 3. Scanning the QR code causes a web browser to be launched on the mobile device 204. The web browser on the mobile device 204 connects to the web server operating on the computing device 202 and executes the web application provided by the web server. The web application operating on the mobile device 204 then sends a connection request to the web server and a network connection (e.g. WebSocket) is established between the mobile device 204 and the client computing device 202.

Once the connection has been established, a popup dialog is displayed on the mobile device, requesting the user to select one or more files or folders to share with the virtual desktop. For example, the user may browse the file and folder directory of the mobile device and select a particular folder to be shared with the virtual desktop. Once the user selects the folder, information identifying the folder is transmitted by the web application operating on the mobile device 204 to the client computing device 202 over the network connection (e.g. Web Socket). The virtual desktop client on the computing device 202 then registers the folder on the virtual desktop 200 and sends an instruction to the virtual desktop 200 to locally mount a corresponding version of the folder on the virtual desktop 200. When the virtual desktop 200 mounts the folder locally, the file input/output (I/O) operations executed on any file in the folder will be redirected to the client computing device 202 and then to the mobile device 204.

In various embodiments, when a file I/O operation is executed on a file in the shared folder by an application operating on the virtual desktop, the file I/O operation is transmitted to the virtual desktop client application on the client computing device 202 using a virtual channel of a remoting protocol (e.g. PCoIP, Blast, RDP, VNC, etc.). The virtual desktop client application then redirects the file I/O operation to the mobile device over the secured HTTP connection (e.g. Web Socket) established between the web application on the browser of the mobile device and the web server operating on the client computing device 202. As such, the client computing device 202 is used as a bridge between the mobile device 204 and the virtual desktop 200 in order to enable file and folder redirection.

Figure 3:
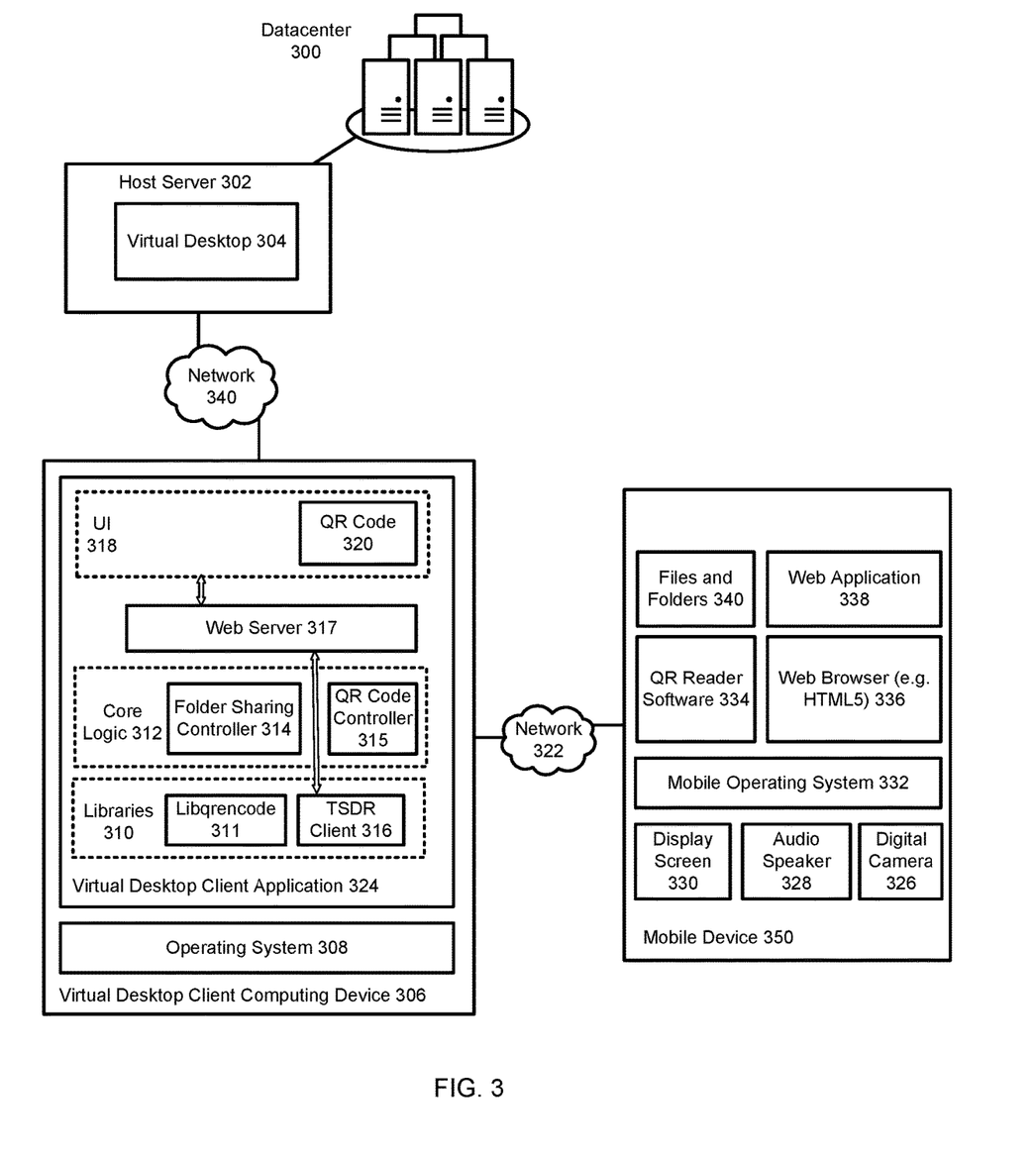
FIG. 3 illustrates the components on the client computing device and the mobile device that enable file and folder redirection for virtual desktops, in accordance with various embodiments.

FIG. 3 illustrates the components on the client computing device and the mobile device that enable file and folder redirection for virtual desktops, in accordance with various embodiments. As illustrated, the virtual desktop client computing device 306 can be any computing device capable of executing a virtual desktop client application 324. In the illustrated embodiment, the virtual desktop client device 306 is a computer having an operating system 308, such as Microsoft Windows, Linux, iOS, Android or other. In various embodiments, the mobile device 350 can be any device capable of establishing an HTTP connection and executing a web browser 336. The mobile device 350 may be equipped with various multimedia accessories, such as a digital camera 326, audio speaker 328 and display screen 330. In some embodiments, the mobile device 350 may be within certain threshold physical vicinity of the virtual desktop computing device 306. In other embodiments, the proximity of the mobile device 350 is not important and the mobile device 350 may be located anywhere if it is capable of establishing a network connection. In some embodiments, the mobile device 350 may be located on the same subnet as the virtual desktop client d8evice 306. In other embodiments, the devices may be located on different subnets.

A user may start the virtual desktop client application 324 on their client computing device 306 in order to connect to their virtual desktop 304 running on a remote host server 302 (housed in a data center 300) using a network connection 340. The connection between the client computing device 306 and the virtual desktop 304 is implemented using a remoting protocol, PCoIP, Blast, RDP, VNC or the like.

When the virtual desktop client application 324 starts up, it sets up a web server 317 which is configured to provide the web application 338 used for enabling the file and folder redirection. The web server 317 may be a module developed using NodeJS and provides an HTTPS service for any mobile devices that need to share their files and folders with the virtual desktop 304.

A user of the virtual desktop may wish to share files and folders residing on their mobile device 350 with the virtual desktop 304. Alternatively, the user may wish to share certain files and folders stored on the virtual desktop 304 and make them accessible on the mobile device 350. In either case, the file and folder redirection feature described herein enables the user to do so without having to install a virtual desktop client application on the mobile device 350. In order to start the redirection, the user may select a menu item or button on the User Interface (UI) 318 of the virtual desktop client application 324 indicating that files/folders should be shared between the virtual desktop 304 and the mobile device 350.

When such input is detected, the QR software (e.g. libqrencode 311) on the virtual desktop client device 306 generates a QR code 320 having information identifying the web server 317 and displays the QR code 320 on the user interface (UI) 318 of the virtual desktop.

A QR code is a type of well-known and widely available matrix barcode (or two-dimensional barcode) which is often used for product tracking or item identification. In most use cases, QR codes are used as machine-readable optical labels that contain information about the item to which they are attached. The QR code encodes data into an image which can be read by another machine. QR codes are often physically printed and/or attached to tangible items, however they can also be displayed on a display screen. In various embodiments described herein, the QR code is displayed on the display screen of a client device 306 (e.g., a PC, laptop, etc.) and be encoded with information that identifies the web server 317 operating on the virtual desktop client device 306.

QR codes can generally be encoded with many different types of information. By way of example, in this disclosure, the QR code can be encoded with a unique device identifier (ID), Internet Protocol (IP) address and one-time use token, among other types of information. In the illustrated embodiment, the QR code 320 is encoded with the IP address of the web server 317 by the virtual desktop client device 306 using QR encoding software, which can be implemented using any freely available QR code generator software, such as libqrencode 311. In some embodiments, the QR encoding software may be integrated and provided to the client device 306 along with the virtual desktop client application 324.

The output of the QR encoder library is RGB data. To simplify the implementation, a bitmap object can be constructed with the output and a picture of it may be drawn using win32 APIs. The content encoded in the QR code may be formatted in the following manner: "https://10.112.119.95:8057" where 10.112.119.95 is the IP address of the virtual desktop client computing device 306 and 8057 is the specified port of the web server 317. In some embodiments, the QR code 320 may also include a one-time use token for security purposes. In these embodiments, besides the server address, the QR code 320 may contain a random string as a token. If file and folder redirection is successfully set up, the token will expire, i.e. become unavailable for future connections.

Once displayed, the QR code may be scanned using a digital camera 326 of a mobile device 350. For example, the user may launch a QR reader application that displays the live camera view of the mobile device 350 and aim the camera 326 of the mobile device 350 at the QR code 320 in order to place the QR code 320 within the field of view (FOV) of the digital camera 326 and to enable the mobile device to scan the QR code 320. The mobile device 130 may contain QR reader software 334 to scan the QR code 320 and to decode the information encoded therein. One example of such a QR code reader software 334 is ZBar which is a C barcode reading library with C++, Python, Perl, and Ruby bindings.

In the illustrated embodiment, the mobile device 350 includes a mobile operating system (OS) 332 (e.g. iOS, Android, etc.) and supporting an HTML5 web browser 336. When the user uses the mobile device 350 to scan the QR code 320 displayed on the virtual desktop client device 306, the web browser 336 (e.g. HTML5 browser) is launched. The web browser 336 of the mobile device 350 connects to the web server 317 over the network connection 322 (e.g., WebSocket connection) and runs the web application 338 inside the web browser 336 on the mobile device. The web application 338 is configured to establish a connection with the web server 317 operating on the client computing device in order to enable file and folder redirection.

Once the connection is established between the mobile device 350 and the client computing device 306, the mobile device 350 displays a message, such as a popup dialog box, requesting the user of the mobile device 350 to select one or more files or folders to be shared with the virtual desktop 304. Once the user selects the files and folders to be shared, the information identifying those selected files/folders (e.g. full file/directory path) is sent from the mobile device 350 to the client computing device 306.

It should be noted that in various embodiments, the connection (i.e. remoting protocol connection) between the virtual desktop client application 324 and the virtual desktop 304 can be made either before or after the user provides input indicating file redirection. For example, in some embodiments, the user may be already connected to their virtual desktop and wish to share the files with the mobile device 350. At this point, the user may select the file/folder sharing menu to start the redirection. In other embodiments, the user may initiate the redirection process before the virtual desktop client application 324 has established a connection with the virtual desktop 304. In these embodiments, the virtual desktop client application 324 can establish the connection with the virtual desktop 304 after the user has identified which files and folders to share.

Once the information identifying the selected folders is sent over HTTP to the client computing device 306, the virtual desktop client 324 sends this information to the virtual desktop 304 and requests the virtual desktop 304 to register the shared folder and mount a corresponding folder locally on the virtual desktop 304. In one embodiment, once the corresponding local folder is mounted, any files residing on the mobile device 350 in the shared folder will appear as though they were locally stored on the corresponding mounted folder on the virtual desktop 304, although the actual content of those files resides on the mobile device 350. The file I/O operations are redirected from the corresponding local folder on the virtual desktop 304 to the client computing device 306 and then to the mobile device 350. The client computing device 306 is used as a bridge for redirecting the file I/O operations between the virtual desktop 304 and the mobile device 350.

In one embodiment, an application executing on the virtual desktop 304 may invoke a file I/O operation on a file appearing in the locally mounted folder that corresponds to the shared folder on the mobile device 350. For example, a photo editing application may issue a file read request to open a digital photograph in the shared folder. Similarly, the photo editing software may issue a file write operation to save an edited version of the digital photograph. In either event, the file I/O operation (read or write request) is sent over a virtual channel of the remoting protocol to the Terminal Service Drive Redirection (TSDR) client 316 on the client computing device 306. The virtual desktop client application 324 then checks whether the file I/O is directed to the folder shared from the mobile device 350. If it is, the TSDR client 316 then transfers the file I/O operation to the web server 317 on the client computing device 306 and the web server 317 then redirects the file I/O operation over the HTTP connection to the web application 338 executing inside the web browser 336 of the mobile device 350. The web application 338 then executes the file I/O operation on the mobile device 350, such as by executing the necessary API calls on the mobile OS 332 of the mobile device 350. As such, if the file I/O is a read operation, the data resulting from the read is returned to the virtual desktop 304. Similarly, if the file I/O is a write operation, the data is saved in the folder 340 on the mobile device 350.

In the illustrated embodiment, the core logic 312 of the virtual desktop client application 324 includes a folder sharing controller 314 and a QR code controller 315. The folder sharing controller 314 provides the capability to enable or disable file and folder sharing from the Web. The QR code controller 315 generates the content in the QR code 320 which will be displayed on the user interface 318 of the virtual desktop client application 324.

In the illustrated embodiment, the TSDR client 316 is the code module for file/folder redirection in the virtual desktop client application 324. It is responsible for handling and executing file I/O requests received from the remote virtual desktop 304 over a virtual channel of the remoting protocol. In order to support redirecting files and folders to/from the mobile device 350 over a secured HTTP connection, the TSDR client 316 is modified to communicate with the web server 317.

Figure 4:
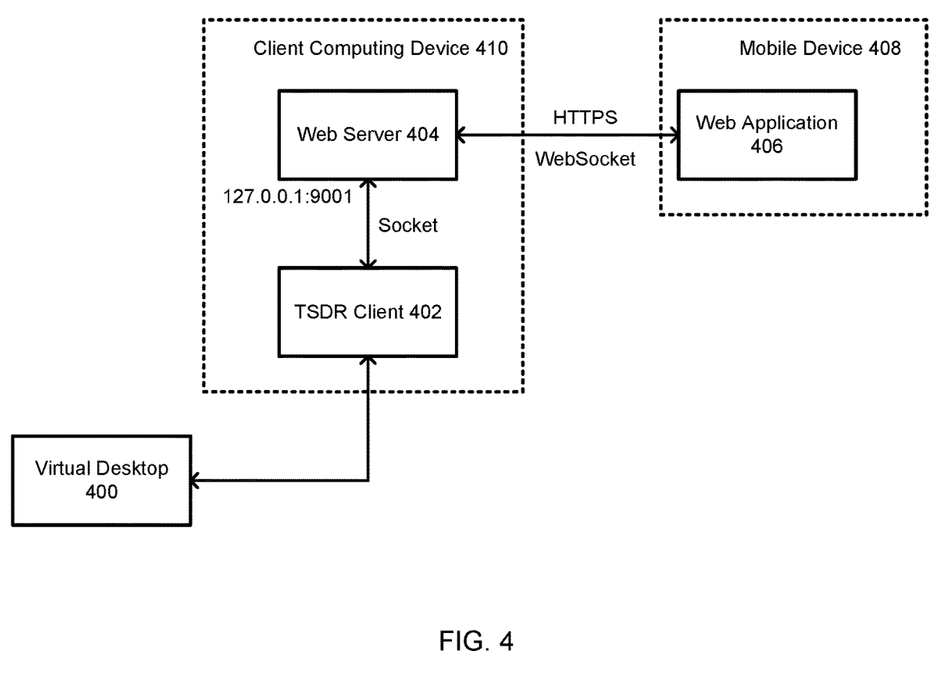
FIG. 4 illustrates an example of the data flow between various components to enable file and folder redirection, in accordance with various embodiments.

FIG. 4 illustrates an example of the data flow between various components to enable file and folder redirection, in accordance with various embodiments. As illustrated, the TSDR client 402 and the web server 404 are executing inside the client computing device 410. The web server 404 is hosted inside the virtual desktop client application and the connection between the TSDR client 402 and the web server 404 is implemented using a socket. For example, the web server 404 may bind to a port (e.g. 127.0.0.1:9001) for a local loopback address. The web application 406 is executing inside the web browser on the mobile device 408. The connection between the web server 404 and the web application 406 is implemented using HTTPS protocol and the file I/O commands will be sent over the WebSocket. The connection between the virtual desktop 400 and the TSDR client 402 is implemented using a virtual channel of a remoting protocol, such as PCoIP, VMware Blast, RDP, VNC, or the like.

Figure 5:
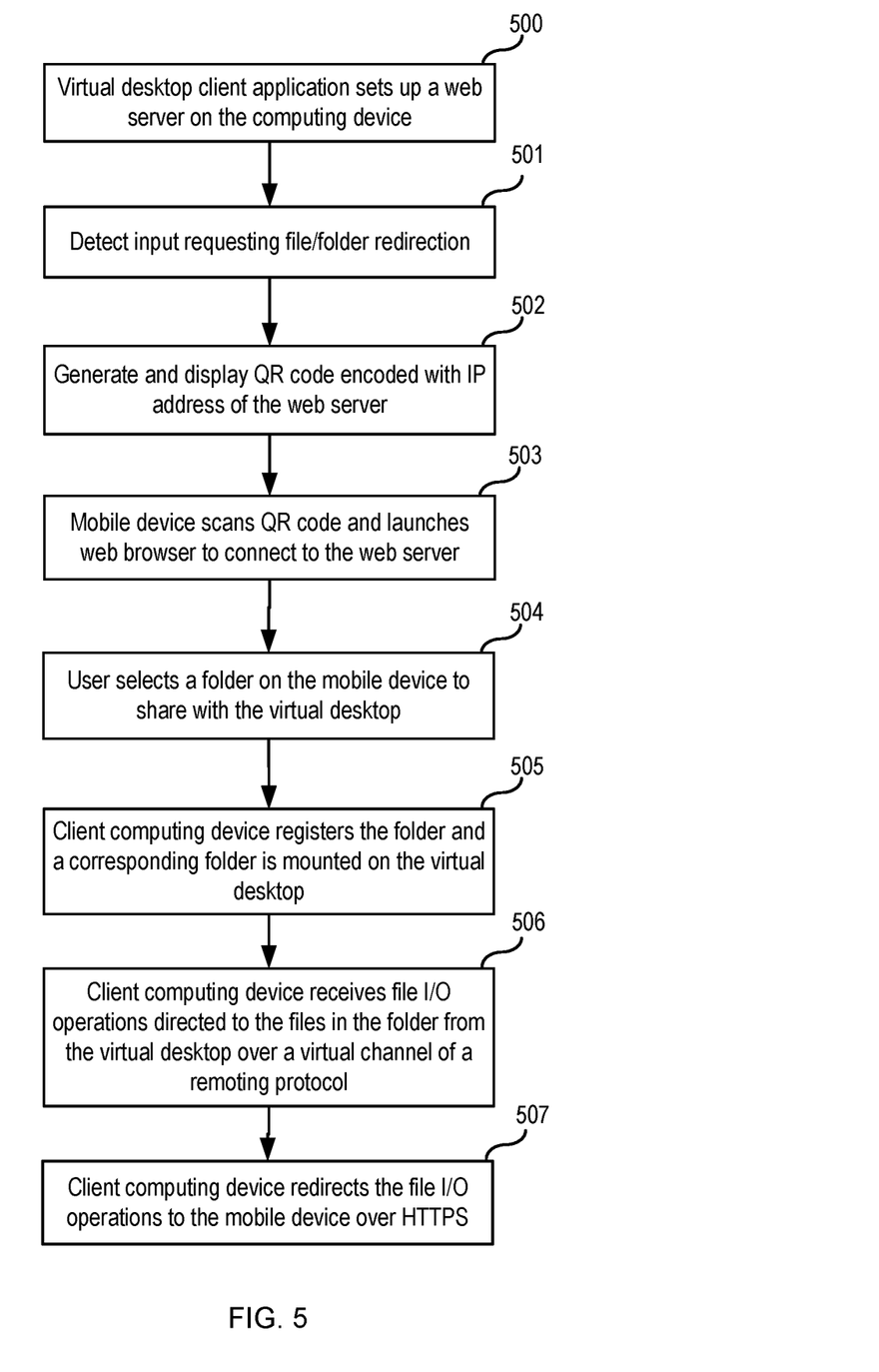
FIG. 5 illustrates an example of a process flow for enabling file and folder redirection, in accordance with various embodiments.

FIG. 5 illustrates an example of a process flow for enabling file and folder redirection, in accordance with various embodiments. As shown in operation 500, the virtual desktop client application establishes a web server on the client computing device. This may be performed when the virtual desktop client application is first launched on the client computing device. In operation 501, the virtual desktop client application detects input requesting file/folder redirection. In operation 502, the virtual desktop client application generates a QR code encoded with the IP address of the web server and displays the QR code on the GUI of the client computing device. In operation 503, a mobile device scans the QR code using a digital camera. In response to scanning the QR code, a web browser is launched on the mobile device. The web browser establishes a connection with the web server on the client computing device and executes a web application hosted by the web server. In operation 504, user input is entered on the mobile device, indicating one or more files and/or folders to be shared with the virtual desktop. The information identifying the selected files/folders is sent to the client computing device. In operation 505, the client computing device registers the selected files/folders with the virtual desktop and causes the virtual desktop to locally mount a folder corresponding to the folder shared from the mobile device. In operation 506, the client computing device receives one or more file I/O operations directed to the files stored in the folder from the virtual desktop. The file I/O operations are received from the virtual desktop over a virtual channel of a remoting protocol. In operation 507, the client computing device redirects the file I/O operations to the mobile device over a secured HTTP connection, where the web application executes the file I/O operations on the files stored in the shared folder.

Figure 6:
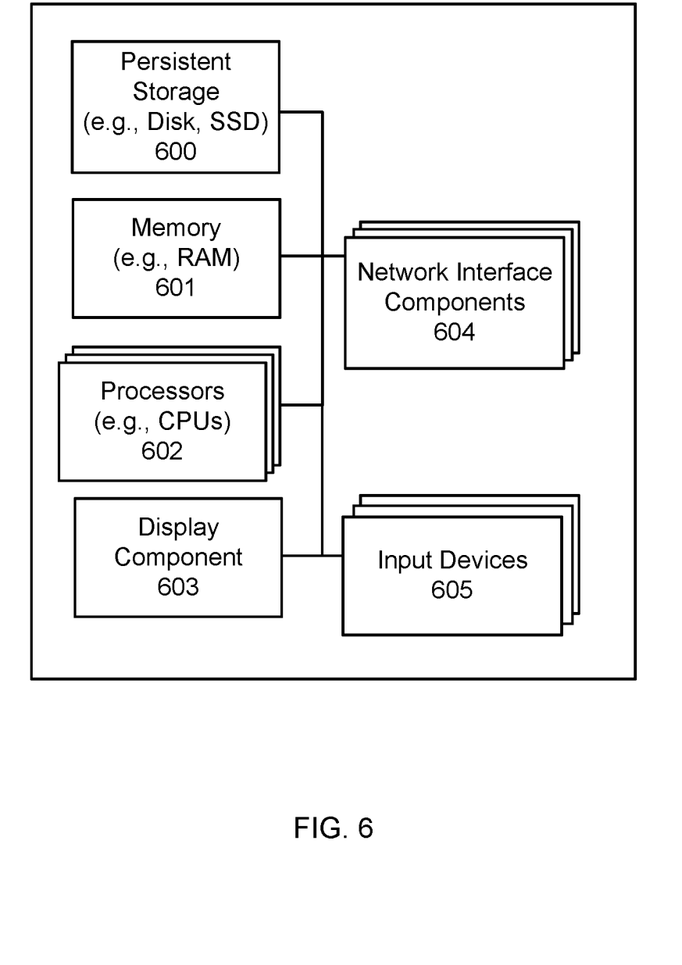
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for enabling file and folder redirection between a virtual desktop, a client computing device, and a mobile device, the method comprising:
setting up a web server on the client computing device by a virtual desktop client application operating on the client computing device, the web server configured to host a web application for enabling file and folder redirection between the virtual desktop and other devices;
connecting to the virtual desktop hosted on a remote server by the virtual desktop client application;
generating, by the virtual desktop client application, an image encoded with information identifying the web server and displaying the image on the client computing device;
receiving a connection request from a mobile device, wherein the connection request is transmitted by the web application that is launched on a web browser of the mobile device in response to the mobile device scanning the image displayed on the client computing device by using a digital camera of the mobile device;
establishing a hypertext transfer protocol (HTTP) connection between the web application on the mobile device and the web server on the client computing device;
receiving, from the mobile device to the client computing device, an identification of a folder on the mobile device that is to be made accessible on the virtual desktop;
sending an instruction, from the client computing device to the virtual desktop, to register and mount the folder of the mobile device locally on the virtual desktop;
receiving one or more file input/output (I/O) operations directed to one or more files in the folder from the virtual desktop to the client computing device, and redirecting the I/O operations received by the client computing device to the mobile device over the HTTP connection.

2. The method of claim 1, wherein the one or more I/O operations are received from the virtual desktop to the client computing device over a virtual channel of a remoting protocol.

3. The method of claim 1, wherein generating the image on the client computing device further comprises:
detecting input on the client computing device indicating a request for file and folder redirection; and
displaying the image on the client computing device in response to the input.

4. The method of claim 1, further comprising:
receiving a file open request from an application operating on the virtual desktop, the file open request identifying a file in the folder on the mobile device;

redirecting the file open request to the mobile device and causing the file to be opened on the virtual desktop;

receiving one or more changes to the file made by the application operating on the virtual desktop;

receiving a file save request from the application; and redirecting the file save request to the mobile device and causing the file to be persisted on the mobile device with the one or more changes made by the application operating on the virtual desktop.

5. The method of claim 1, wherein causing a corresponding folder to be mounted on the virtual desktop further comprises:

sending an instruction from the virtual desktop client application on the client computing device to the virtual desktop, the instruction configured to mount the folder as local storage on the virtual desktop.

6. The method of claim 1, wherein the image is a Quick Response (QR) code that is encoded with the Internet Protocol (IP) address of the web server operating on the client computing device.

7. The method of claim 6, wherein the QR code contains a one-time token that makes the QR code unavailable for future connections after the web connection is established between the web browser of the mobile device and the web server operating on the client computing device.

8. A computing system, comprising:

at least one processor; and memory including instructions that, when executed by the at least one processor, cause the computing system to perform the steps of:

setting up a web server on a client computing device by a virtual desktop client application operating on the client computing device, the web server configured to host a web application for enabling file and folder redirection between the virtual desktop and other devices;

connecting to the virtual desktop hosted on a remote server by the virtual desktop client application;

generating, by the virtual desktop client application, an image encoded with information identifying the web server and displaying the image on the client computing device;

receiving a connection request from a mobile device, wherein the connection request is transmitted by the web application that is launched on a web browser of the mobile device in response to the mobile device scanning the image displayed on the client computing device by using a digital camera of the mobile device;

establishing a hypertext transfer protocol (HTTP) connection between the web application on the mobile device and the web server on the client computing device;

receiving, from the mobile device to the client computing device, an identification of a folder on the mobile device that is to be made accessible on the virtual desktop;

sending an instruction, from the client computing device to the virtual desktop, to register and mount the folder of the mobile device locally on the virtual desktop;

receiving one or more file input/output (I/O) operations directed to one or more files in the folder from the virtual desktop to the client computing device, and redirecting the I/O operations received by the client computing device to the mobile device over the HTTP connection.

9. The computing system of claim 8, wherein the one or more I/O operations are received from the virtual desktop to the client computing device over a virtual channel of a remoting protocol.

10. The computing system of claim 8, wherein generating the image on the client computing device further comprises:

detecting input on the client computing device indicating a request for file and folder redirection; and displaying the image on the client computing device in response to the input.

11. The computing system of claim 8, wherein the memory further comprises instructions that, when executed by the at least one processor, cause the computing system to perform the steps of:

receiving a file open request from an application operating on the virtual desktop, the file open request identifying a file in the folder on the mobile device;

redirecting the file open request to the mobile device and causing the file to be opened on the virtual desktop;

receiving one or more changes to the file made by the application operating on the virtual desktop;

receiving a file save request from the application; and redirecting the file save request to the mobile device and causing the file to be persisted on the mobile device with the one or more changes made by the application operating on the virtual desktop.

12. The computing system of claim 8, wherein causing a corresponding folder to be mounted on the virtual desktop further comprises:

sending an instruction from the virtual desktop client application on the client computing device to the virtual desktop, the instruction configured to mount the folder as local storage on the virtual desktop.

13. The computing system of claim 8, wherein the image is a Quick Response (QR) code that is encoded with the Internet Protocol (IP) address of the web server operating on the client computing device.

14. The computing system of claim 13, wherein the QR code contains a one-time token that makes the QR code unavailable for future connections after the web connection is established between the web browser of the mobile device and the web server operating on the client computing device.

15. A non-transitory computer readable storage medium comprising one or more sequences of instructions, the instructions when executed by one or more processors causing the one or more processors to execute the operations of:

setting up a web server on a client computing device by a virtual desktop client application operating on the client computing device, the web server configured to host a web application for enabling file and folder redirection between the virtual desktop and other devices;

connecting to the virtual desktop hosted on a remote server by the virtual desktop client application;

generating, by the virtual desktop client application, an image encoded with information identifying the web server and displaying the image on the client computing device;

receiving a connection request from a mobile device, wherein the connection request is transmitted by the web application that is launched on a web browser of the mobile device in response to the mobile device scanning the image displayed on the client computing device by using a digital camera of the mobile device;

establishing a hypertext transfer protocol (HTTP) connection between the web application on the mobile device and the web server on the client computing device;

receiving, from the mobile device to the client computing device, an identification of a folder on the mobile device that is to be made accessible on the virtual desktop;

sending an instruction, from the client computing device to the virtual desktop, to register and mount the folder of the mobile device locally on the virtual desktop;

receiving one or more file input/output (I/O) operations directed to one or more files in the folder from the virtual desktop to the client computing device, and redirecting the I/O operations received by the client computing device to the mobile device over the HTTP connection.

16. The non-transitory computer readable storage medium of claim 15, wherein the one or more I/O operations are received from the virtual desktop to the client computing device over a virtual channel of a remoting protocol.

17. The non-transitory computer readable storage medium of claim 15, wherein generating the image on the client computing device further comprises:
   detecting input on the client computing device indicating a request for file and folder redirection; and
   displaying the image on the client computing device in response to the input.

18. The non-transitory computer readable storage medium of claim 15, further comprising instructions executed by one or more processors and causing the one or more processors to execute the operations of:
   receiving a file open request from an application operating on the virtual desktop, the file open request identifying a file in the folder on the mobile device;
   redirecting the file open request to the mobile device and causing the file to be opened on the virtual desktop;
   receiving one or more changes to the file made by the application operating on the virtual desktop;
   receiving a file save request from the application; and
   redirecting the file save request to the mobile device and causing the file to be persisted on the mobile device with the one or more changes made by the application operating on the virtual desktop.

19. The non-transitory computer readable storage medium of claim 15, wherein causing a corresponding folder to be mounted on the virtual desktop further comprises:
   sending an instruction from the virtual desktop client application on the client computing device to the virtual desktop, the instruction configured to mount the folder as local storage on the virtual desktop.

20. The non-transitory computer readable storage medium of claim 15, wherein the image is a Quick Response (QR) code that is encoded with the Internet Protocol (IP) address of the web server operating on the client computing device.

* * * * *